(12) United States Patent
Ghaderi

(10) Patent No.: US 11,031,880 B2
(45) Date of Patent: Jun. 8, 2021

(54) POWER CONVERTER, MOTOR DRIVING UNIT, AND ELECTRIC POWER STEERING DEVICE

(71) Applicant: Nidec Corporation, Kyoto (JP)

(72) Inventor: Ahmad Ghaderi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 12 days.

(21) Appl. No.: 16/487,887

(22) PCT Filed: Mar. 5, 2018

(86) PCT No.: PCT/JP2018/008278
§ 371 (c)(1),
(2) Date: Aug. 22, 2019

(87) PCT Pub. No.: WO2018/180238
PCT Pub. Date: Oct. 4, 2018

(65) Prior Publication Data
US 2020/0028446 A1  Jan. 23, 2020

(30) Foreign Application Priority Data
Mar. 29, 2017 (JP) .............................. JP2017-064335

(51) Int. Cl.
*H02P 27/08* (2006.01)
*H02M 7/487* (2007.01)
*B62D 5/04* (2006.01)
*H02M 7/5387* (2007.01)

(52) U.S. Cl.
CPC .......... *H02M 7/487* (2013.01); *B62D 5/0403* (2013.01); *B62D 5/0463* (2013.01); *H02M 7/53871* (2013.01); *H02P 27/08* (2013.01)

(58) Field of Classification Search
CPC ..... H02P 27/08; H02M 7/53871; H02M 1/32; H02M 7/487; B62D 5/0403; B62D 5/0463
See application file for complete search history.

(56) References Cited

U.S. PATENT DOCUMENTS 8,040,096 B2 * 10/2011 Taniguchi ............. H02P 29/032
318/490
8,743,573 B2  6/2014 Balpe
(Continued)

FOREIGN PATENT DOCUMENTS

JP  2008-132919 A  6/2008
JP  2015-33212 A * 2/2015 ............. H02P 27/04
(Continued)

OTHER PUBLICATIONS

Official Communication issued in International Patent Application No. PCT/JP2018/008278, dated Jun. 5, 2018.
(Continued)

*Primary Examiner* — Rina I Duda
(74) *Attorney, Agent, or Firm* — Keating & Bennett

(57) ABSTRACT

A power converter to convert power from a power supply into power supplied to a motor including n-phase windings, where n is an integer of 3 or more, in which first ends thereof are Y-connected and includes an inverter connected to second ends of the n-phase windings, a phase separation relay circuit to switch connection and disconnection between the power supply and the n-phase windings for each phase, a neutral point leg connected to a neutral point node of the motor, in which the first ends of the n-phase windings are Y-connected, and a neutral point separation relay circuit to switch connection and disconnection between the power supply and the neutral point node.

15 Claims, 7 Drawing Sheets

(56) References Cited

U.S. PATENT DOCUMENTS

| | | | |
|---|---|---|---|
| 9,359,004 B2 | 6/2016 | Kawata et al. | |
| 2009/0115355 A1* | 5/2009 | Oyobe | H02P 5/74 |
| | | | 318/34 |
| 2014/0132190 A1* | 5/2014 | Kitano | B60L 3/0069 |
| | | | 318/400.22 |
| 2015/0012161 A1* | 1/2015 | Kanekawa | B62D 5/0487 |
| | | | 701/22 |
| 2016/0036371 A1 | 2/2016 | Yamasaki | |
| 2016/0173020 A1* | 6/2016 | Kanekawa | H02P 27/06 |
| | | | 318/400.06 |

FOREIGN PATENT DOCUMENTS

| | | |
|---|---|---|
| JP | 2015-033268 A | 2/2015 |
| JP | 2015-231321 A | 12/2015 |
| JP | 2016-019385 A | 2/2016 |

OTHER PUBLICATIONS

Basler et al., "Fault-Tolerant Strategies for Electronic Power Steering Systems under Functional Safety Requirements", URL:https://www.researchgate.net/publication/271318741, Jun. 25, 2015, 7 pages.

Lawson et al., "Fault Tolerant Control for an Electric Power Steering System", 17th IEEE International Conference on Control Applications Part of 2008 IEEE Multi-conference on Systems and Control, ThA02.3, Sep. 3-5, 2008, pp. 486-491.

Ji et al., "Reliability improvement of electric power steering system based on ISO 26262", 2013 International Conference on Quality, Reliability, Risk, Maintenance, and Safety Engineering, Jul. 15-18, 2013, 6 pages.

* cited by examiner

POWER CONVERTER, MOTOR DRIVING UNIT, AND ELECTRIC POWER STEERING DEVICE

CROSS REFERENCE TO RELATED APPLICATIONS

This is the U.S. national stage of application No. PCT/JP2018/008278, filed on Mar. 5, 2018, and priority under 35 U.S.C. § 119(a) and 35 U.S.C. § 365(b) is claimed from Japanese Application No. 2017-064335, filed Mar. 29, 2017; the entire contents of which are incorporated herein by reference.

1. Field of the Invention

The present disclosure relates to a power converter, a motor driving unit, and an electric power steering device.

2. Background

Recently, an electromechanical integrated motor has been developed in which an electric motor (hereinafter simply expressed as a "motor"), a power converter, and an electronic control unit (ECU) are integrated. Meanwhile, in a vehicle field, high-quality assurance is required from the viewpoint of safety. Thus, a redundant design capable of continuing safe operation even when a portion of a component fails is adopted. As an example of the redundant design, providing two power converters for one motor has been considered. As another example, providing a backup microcontroller in a main microcontroller has been considered.

In a motor driving device having a first system and a second system as a related art, the first system is connected to a first winding set of a motor and includes a first inverter, a power supply relay, a reverse connection protection relay, and the like. The second system is connected to a second winding set of the motor and includes a second inverter, a power supply relay, a reverse connection protection relay, and the like. When there is no failure in the motor driving device, the motor driving device may drive the motor using both the first system and the second system. However, when a failure occurs in one of the first system and the second system or one of the first winding set and the second winding set, the power supply relay cuts off the supply of power from a power supply connected to the failed system or the failed winding set. Accordingly, the motor may be continuously driven using the other non-failed system.

In a motor driving device having a first system and a second system as a related art, even when one system or one winding set has failed, a motor may be continuously driven by a system which has not failed.

In a motor driving device including four electrical isolation devices and two inverters and configured to convert power supplied to a three-phase motor as a related art, in each inverter, one electrical isolation device is installed between a power supply and the inverter, and one electrical isolation device is installed between the inverter and a GND. A motor may be driven by an inverter which has not failed using a neutral point of a winding of an inverter which has failed. Here, the failed inverter is isolated from the power supply and the GND by changing the two electrical isolation devices connected to the failed inverter to a cut off state.

SUMMARY

In the above-described related art, there is a need for further improvement of a motor output in control in an abnormal state.

A power converter according to an example embodiment of the present disclosure converts power from a power supply into power supplied to a motor having n-phase (n is an integer of 3 or more) windings in which first ends thereof are Y-connected and includes, an inverter connected to second ends of the n-phase windings and including n legs each including a low-side switching element and a high-side switching element, a phase separation relay circuit to switch connection and disconnection between the power supply and the n-phase windings for each phase, a neutral point leg including a low-side switching element and a high-side switching element and connected to a neutral point node of the motor, in which the first ends of the n-phase windings are Y-connected, and a neutral point separation relay circuit to switch connection and disconnection between the power supply and the neutral point node.

The above and other elements, features, steps, characteristics and advantages of the present disclosure will become more apparent from the following detailed description of the example embodiments with reference to the attached drawings.

DETAILED DESCRIPTION

Hereinafter, example embodiments of power converters, motor driving units and electric power steering devices of the present disclosure will be described in detail with reference to the accompanying drawings. However, in order to avoid unnecessary redundancy in the following description and to facilitate the understanding of those skilled in the art, an unnecessary detailed description may be omitted. For example, the detailed description of already well-known items and a redundant description of substantially the same configuration may be omitted.

In the present specification, example embodiments of the present disclosure will be described with an example of a power converter that converts power from a power supply into power supplied to a three-phase motor having three-phase (U-phase, V-phase, and W-phase) windings. However, a power converter that converts power from a power supply to power supplied to an n-phase motor having n phases (n is an integer of 4 or more) such as four- or five-phase windings is also within the scope of the present disclosure.

Figure 1:
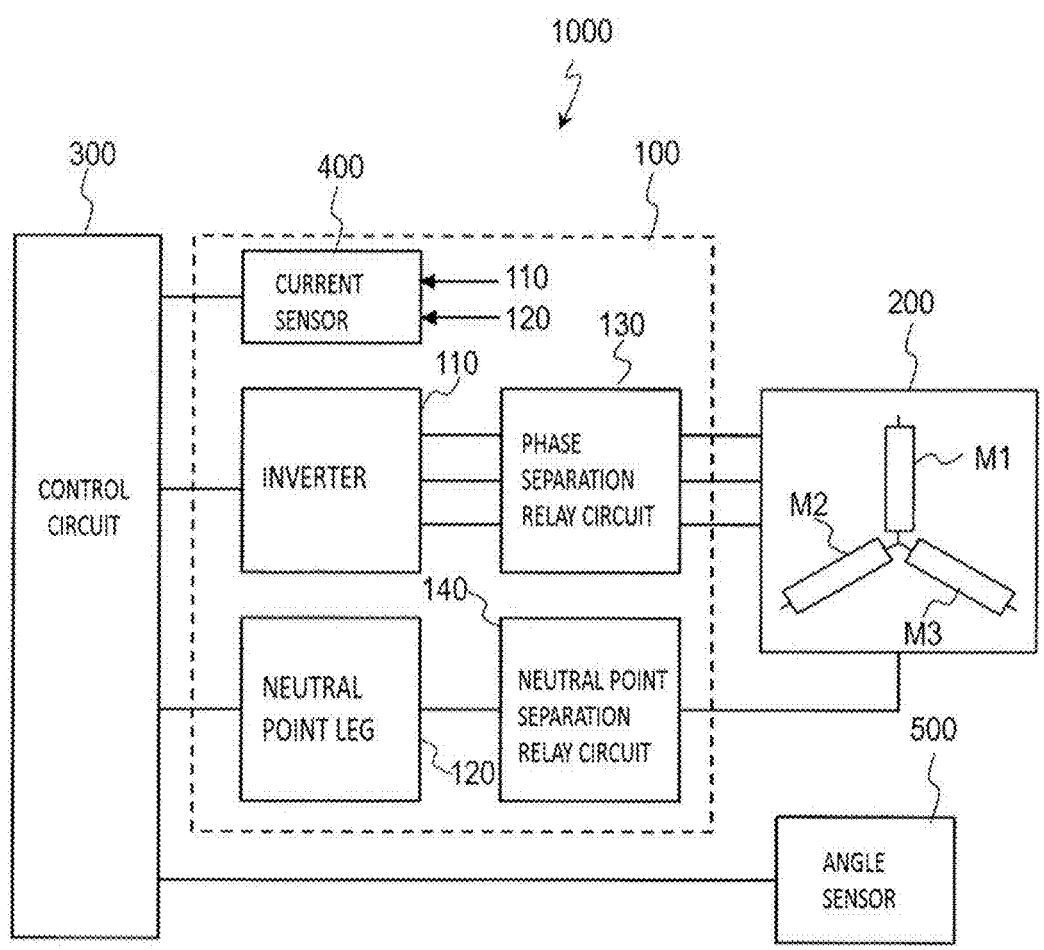
FIG. 1 is a block diagram schematically illustrating a typical block configuration of a motor driving unit (1000) according to a first example embodiment of the present disclosure.

FIG. 1 schematically illustrates a typical block configuration of a motor driving unit 1000 according to the present example embodiment.

The motor driving unit 1000 typically includes a power converter 100, a motor 200, a control circuit 300, and an angle sensor 500. The angle sensor 500 may not be necessary depending on a method of controlling the motor (for example, sensorless control).

The motor driving unit 1000 is modularized and may be manufactured and sold as a motor module including, for example, a motor, a sensor, a driver, and a controller. In the present specification, the motor driving unit 1000 will be described as an example of a system including the motor 200 as a component. However, the motor driving unit 1000 may be a system for driving the motor 200 without including the motor 200 as a component.

The power converter 100 includes an inverter 110, a neutral point leg 120, a phase separation relay circuit 130, a neutral point separation relay circuit 140, and a current sensor 400. The power converter 100 may convert power from a power supply 101 (see FIG. 2) into power supplied to the motor 200. The inverter 110 is connected to the motor 200. For example, the inverter 110 may convert direct current (DC) power into three-phase alternating current (AC) power which is a pseudo sine wave of a U-phase, a V-phase and a W-phase. In the present specification, "connection" between parts (components) mainly refers to an electrical connection.

The motor 200 is, for example, a three-phase AC motor. The motor 200 includes a U-phase winding M1, a V-phase winding M2, and a W-phase winding M3. One ends of the windings M1, M2, and M3 are Y-connected to each other.

The control circuit 300 is configured with a microcontroller and the like. The control circuit 300 controls the power converter 100 according to input signals from the current sensor 400 and the angle sensor 500. The control methods include, for example, vector control, pulse width modulation (PWM), and direct torque control (DTC).

The angle sensor 500 is, for example, a resolver or a Hall integrated circuit (IC). The angle sensor 500 is implemented through a combination of a magnetoresistance (MR) sensor having an MR element and a sensor magnet. The angle sensor 500 detects a rotation angle (hereinafter, expressed as a "rotation signal") of a rotor of the motor 200 and outputs the rotation signal to the control circuit 300.

The specific circuit configuration of the power converter 100 will be described with reference to FIG. 2.

Figure 2:
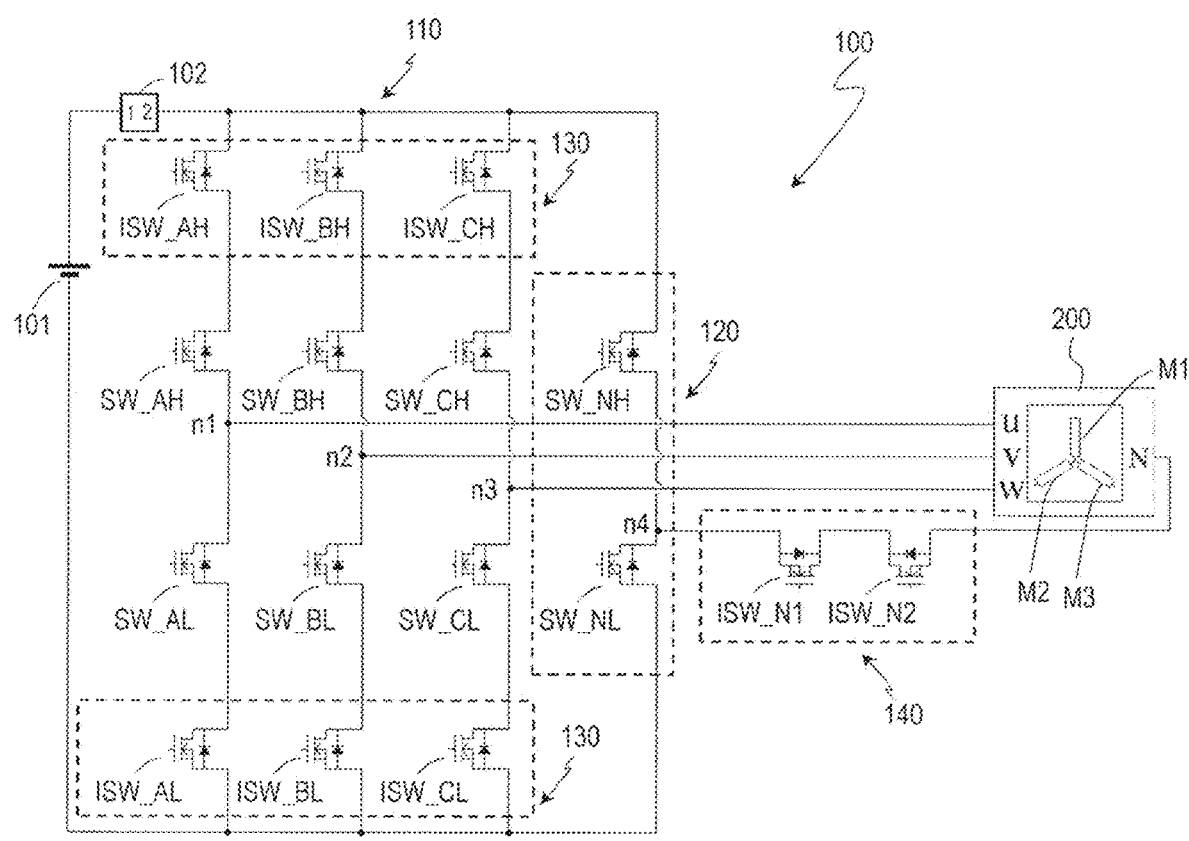
FIG. 2 is a circuit diagram schematically illustrating a typical circuit configuration of the power converter (100) according to the first example embodiment of the present disclosure.

FIG. 2 schematically illustrates a typical circuit configuration of the power converter 100 according to the present example embodiment.

The power supply 101 generates a predetermined power supply voltage (for example, 12 V). For example, a DC power supply is used as the power supply 101. However, the power supply 101 may be an AC-to-DC converter or a DC-to-DC converter and may be a battery (storage battery).

A fuse 102 is connected between the power supply 101 and the inverter 110. The fuse 102 may cut off a high current that may flow from the power supply 101 to the inverter 110. A relay or the like may be used instead of the fuse.

Although not shown in the drawing, a coil is installed between the power supply 101 and the inverter 110. The coil functions as a noise filter and smooths high-frequency noise included in a voltage waveform supplied to the inverter or high-frequency noise generated in the inverter so as not to flow toward the power supply 101. Further, a capacitor is connected to a power terminal of the inverter. The capacitor is a so-called bypass capacitor and suppresses voltage ripples. The capacitor is, for example, an electrolytic capacitor, and the capacity and the number to be used are appropriately determined according to design specifications and the like.

The inverter 110 includes a bridge circuit composed of three legs. Each leg includes a high-side switching element and a low-side switching element. A U-phase leg includes a high-side switching element SW_AH and a low-side switching element SW_AL. A V-phase leg includes a high-side switching element SW_BH and a low-side switching element SW_BL. A W-phase leg includes a high-side switching element SW_CH and a low-side switching element SW_CL. As an example, a field effect transistor (FET) (typically a metal oxide semiconductor field effect transistor (MOSFET)) or an insulated gate bipolar transistor (IGBT) may be used as the switching element.

The inverter 110 is a current sensor 400 (see FIG. 1) configured to detect a current (sometimes referred to as a "phase current") flowing through, for example, a winding of each of the U-phase, the V-phase, and the W-phase, and includes a shunt resistor (not shown) provided in each leg thereof. A current sensor 400 includes a current detection circuit (not shown) that detects a current flowing through each shunt resistor. For example, the shunt resistor may be connected between the low-side switching element and a GND in each leg. A resistance value of the shunt resistor is, for example, in the range of about 0.5 mΩ to 1.0 mΩ.

The number of shunt resistors is not limited to three. For example, it is possible to use two shunt resistors for the U-phase and the V-phase, two shunt resistors for the V-phase and the W-phase, and two shunt resistors for the U-phase and the W-phase. The number of shunt resistors to be used and the arrangement of the shunt resistors are appropriately determined in consideration of product costs, design specifications, and the like.

The U-phase leg of the inverter 110 (specifically, a node n1 between the high-side switching element and the low-side switching element) is connected to the other end of the U-phase winding M1 of the motor 200. A node n2 of the V-phase leg is connected to the other end of the V-phase winding M2. A node n3 of the W-phase leg is connected to the other end of the W-phase winding M3.

The neutral point leg 120 includes a high-side switching element SW_NH and a low-side switching element SW_NL. The neutral point leg 120 includes shunt resistors like the other legs. The neutral point leg 120 is connected between low-side and high-side nodes to which the three legs of the inverter 110 are connected. The inverter 110 may be manufactured as a bridge circuit provided with four legs including the neutral point leg 120.

A node n4 of the neutral point leg 120 may be connected to a node N in which one ends of the windings M1, M2, and M3 of the motor 200 are Y-connected to each other. The node N functions as a neutral point while the motor is driven and thus is called as a "neutral point node N".

The phase separation relay circuit 130 switches connection and disconnection between the power supply 101 and each of the three-phase windings M1, M2, and M3. In the present example embodiment, the phase separation relay circuit 130 switches connection and disconnection between the power supply 101 and the inverter 110 for each phase.

In the inverter 110, the phase separation relay circuit 130 includes three-phase separation relays ISW_AH, ISW_BH, and ISW_CH connected between the high-side node and the three high-side switching elements SW_AH, SW_BH, and SW_CH, respectively. The phase separation relay ISW_AH is positioned in the U-phase leg. The phase separation relay ISW_BH is positioned in the V-phase leg. The phase separation relay ISW_CH is positioned in the W-phase leg.

In the inverter 110, the phase separation relay circuit 130 further includes three-phase separation relays ISW_AL, ISW_BL, and ISW_CL connected between the low-side node and the three low-side switching elements SW_AL, SW_BL, and SW_CL, respectively. The phase separation relay ISW_AL is positioned in the U-phase leg. The phase separation relay ISW_BL is positioned in the V-phase leg. The phase separation relay ISW_CL is positioned in the W-phase leg.

As an example, a semiconductor switch such as a MOSFET may be used as the separation relay. Other semiconductor switches such as thyristors and analog switch ICs, or mechanical relays may be used. A combination of IGBTs and diodes may also be used.

In FIG. 2, an example in which a MOSFET having a parasitic diode therein is used as the switching element and each separation relay of the inverter 110 is illustrated. In each phase leg, the high-side phase separation relay and the high-side switching element are connected to each other in series so that a forward current flows through the internal parasitic diodes thereof in the same direction. The low-side phase separation relay and the low-side switching element are connected to each other in series so that a forward current flows through the internal parasitic diodes thereof in the same direction.

The neutral point separation relay circuit 140 switches connection and disconnection between the power supply 101 and the neutral point node N. In the present example embodiment, the neutral point separation relay circuit 140 is connected between the neutral point leg 120 and the neutral point node N. The neutral point separation relay circuit 140 switches connection and disconnection between the neutral point leg 120 and the neutral point node N.

The neutral point separation relay circuit 140 includes a bidirectional switch. For example, the neutral point separation relay circuit 140 includes two neutral point separation relays ISW_N1 and ISW_N2 connected to each other in series. The neutral point separation relay ISW_N1 is connected to the neutral point leg 120. The neutral point separation relay ISW_N2 is connected to the neutral point node N. The neutral point separation relay ISW_N1 is disposed such that a forward current flows in the internal diode toward the neutral point node N. The neutral point separation relay ISW_N2 is disposed such that a forward current flows in the internal diode toward the neutral point leg 120.

The neutral point separation relay ISW_N1 is connected to each of the high-side switching element SW_NH and the low-side switching element SW_NL of the neutral point leg 120 in series. The neutral point separation relay ISW_N2 is also connected to each of the high-side switching element SW_NH and the low-side switching element SW_NL in series.

Figure 3:
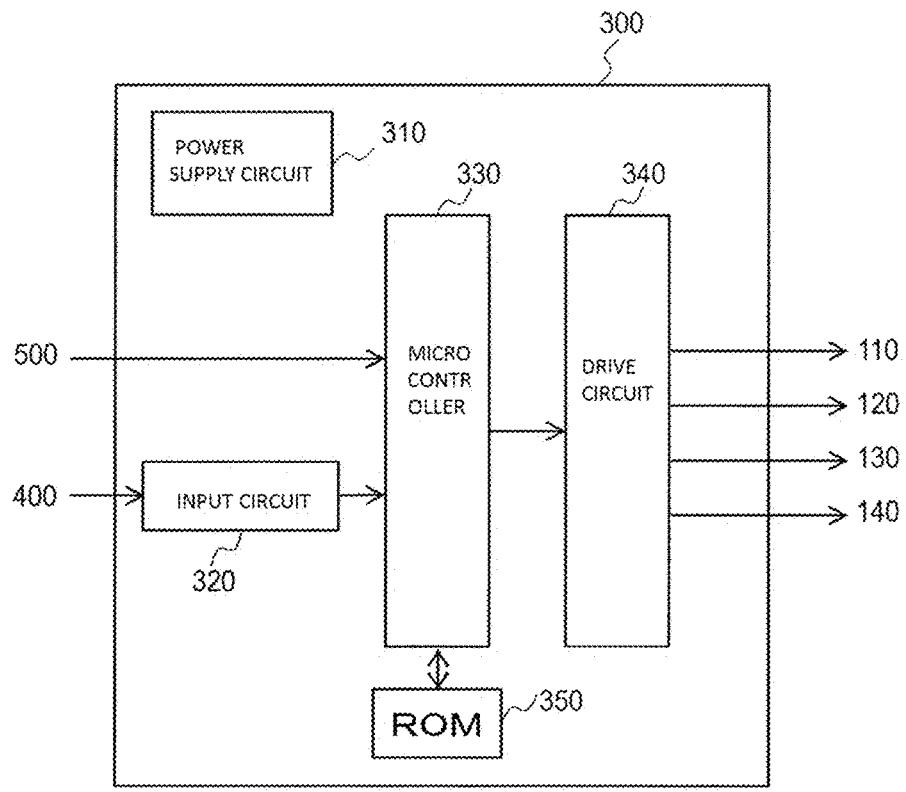
FIG. 3 is a block diagram illustrating a typical block configuration of control circuit 300.

FIG. 3 illustrates a typical block configuration of the control circuit 300.

The control circuit 300 includes, for example, a power supply circuit 310, an input circuit 320, a microcontroller 330, a driving circuit 340, and a read-only memory (ROM) 350. The control circuit 300 is connected to the power converter 100. The control circuit 300 may drive the motor 200 by controlling the power converter 100, specifically, the inverter 110, the neutral point leg 120, the phase separation relay circuit 130, and the neutral point separation relay circuit 140 (see FIG. 1). The control circuit 300 may implement closed-loop control by controlling a target position, rotation speed, and a current, or the like of the rotor. Further, a torque sensor may be used instead of the angle sensor 500 (see FIG. 1). In this case, the control circuit 300 may control target motor torque.

The power supply circuit 310 generates DC voltages (for example, 3 V or 5 V) necessary for each block in the circuit.

The input circuit 320 receives a motor current value (hereinafter, expressed as an "actual current value") detected by the current sensor 400. The input circuit 320 converts a level of the actual current value into an input level of the microcontroller 330 as necessary and outputs the actual current value to the microcontroller 330. The input circuit 320 is an analog-to-digital conversion circuit.

The microcontroller 330 receives a rotation signal of the rotor detected by the angle sensor 500. The microcontroller 330 sets a target current value according to the actual current value, the rotation signal of the rotor, and the like to generate a pulse width modulation (PWM) signal and outputs the generated PWM signal to the driving circuit 340.

For example, the microcontroller 330 generates the PWM signal for controlling the switching operation (turning on or off) of each switching element of the inverter 110 and the neutral point leg 120 of the power converter 100. The microcontroller 330 generates a signal that determines an on or off state of each separation relay in each of the separation relay circuits of the power converter 100.

The driving circuit 340 is typically a gate driver. The driving circuit 340 generates a control signal (for example, a gate control signal) for controlling the switching operation of each switching element of the inverter 110 and the neutral point leg 120 according to the PWM signal and supplies the generated control signal to each switching element. Further, the driving circuit 340 may generate a control signal (analog signal) for turning each separation relay on or off according to the signal from the microcontroller 330, which determines the on or off state of each separation relay, and supply the generated control signal to each separation relay. The microcontroller 330 may have the function of the driving circuit 340. In that case, the driving circuit 340 is not required.

The ROM 350 is, for example, a writable memory (for example, a programmable ROM (PROM)), a rewritable memory (for example, a flash memory), or a ROM. The ROM 350 stores control programs including an instruction group allowing the microcontroller 330 to control the power converter 100. For example, the control programs are once loaded in a random access memory (RAM) (not shown) at booting.

Control modes of the power converter 100 include a control mode in a normal state and a control mode in an abnormal state. The control circuit 300 (mainly the microcontroller 330) may switch the control of the power converter 100 from the control mode in the normal state to the control mode in an abnormal state. Depending on the control mode, the on or off state of each separation relay of the phase separation relay circuit 130 and the neutral point separation relay circuit 140 is determined.

Hereinafter, an electrical connection relationship between the power supply 101, the inverter 110, and the windings M1, M2, and M3 of the motor 200 will be described in detail according to the on or off state of the phase separation relay circuit 130 and the on or off state of the neutral point separation relay circuit 140.

In the present specification, "the phase separation relay circuit 130 is turned on" refers to all of the phase separation relays ISW_AH, ISW_BH, ISW_CH, ISW_AL, ISW_BL, and ISW_CL of the phase separation relay circuit 130 being turned on. "The phase separation relay circuit 130 is turned off" refers to all of the phase separation relays ISW_AH, ISW_BH, ISW_CH, ISW_AL, ISW_BL, and ISW_CL being turned off.

When the phase separation relay circuit 130 is turned on, the inverter 110 is electrically connected to the power supply 101. When the phase separation relay circuit 130 is turned off, the inverter 110 is electrically disconnected from the power supply 101.

As described above, switching connection and disconnection between the three legs of the inverter 110 and the power supply 101 may be performed for each phase. For example, the U-phase leg is electrically disconnected from the power supply 101 by turning off the phase separation relay ISW_AH and the phase separation relay ISW_AL. Here, the V-phase leg and the W-phase leg are connected to the power supply 101.

In the present specification, "the neutral point separation relay circuit 140 is turned on" refers to the neutral point separation relays ISW_N1 and ISW_N2 of the neutral point separation relay circuit 140 being turned on. "The neutral point separation relay circuit 140 is turned off" refers to the neutral point separation relays ISW_N1 and ISW_N2 being turned off.

When the neutral point separation relay circuit 140 is turned on, the node n4 of the neutral point leg 120 is connected to the neutral point node N of the motor 200. When the neutral point separation relay circuit 140 is turned off, the node n4 of the neutral point leg 120 is electrically disconnected from the neutral point node N of the motor 200.

Hereinafter, a specific example of an operation of the motor driving unit 1000 will be described, and a specific example of an operation of the power converter 100 will be mainly described.

First, a specific example of a control method in the normal state of the power converter 100 will be described.

In the present specification, a "normal state" indicates that there is no failure in the inverter 110, the neutral point leg 120, and the windings M1, M2, and M3 of the motor 200. An "abnormal state" indicates that a failure occurs in the switching elements in the bridge circuit of the inverter and a failure occurs in the motor winding. The failure of the switching element mainly refers to an open failure and a short failure of the semiconductor switching element such as a FET. The "open failure" refers to a failure in which a connection between a source and a drain of the FET is opened (in other words, a resistance rds between the source and the drain becomes high impedance), and the "short failure" refers to a failure in which the source and the drain of the FET are short-circuited. The failure of the winding is, for example, disconnection of the winding.

In the control mode in the normal state, the control circuit 300 (mainly the microcontroller 330) turns on the phase separation relay circuit 130. The inverter 110 is connected to the power supply 101 by this control. In other words, the windings M1, M2, and M3 of the motor 200 are electrically connected to the power supply 101 through the inverter 110. Thus, power may be supplied from the inverter 110 to the motor 200.

The control circuit 300 turns off the neutral point separation relay circuit 140. Due to the control, the neutral point leg 120 is electrically disconnected from the neutral point node N of the motor 200. No power is supplied from the neutral point leg 120 to the neutral point node N.

The control circuit 300 may energize the three-phase windings M1, M2, and M3 by controlling the switching operation of the switching element of the inverter 110. In the present specification, such an energization control is referred to as a "three-phase energization control".

Figure 4:
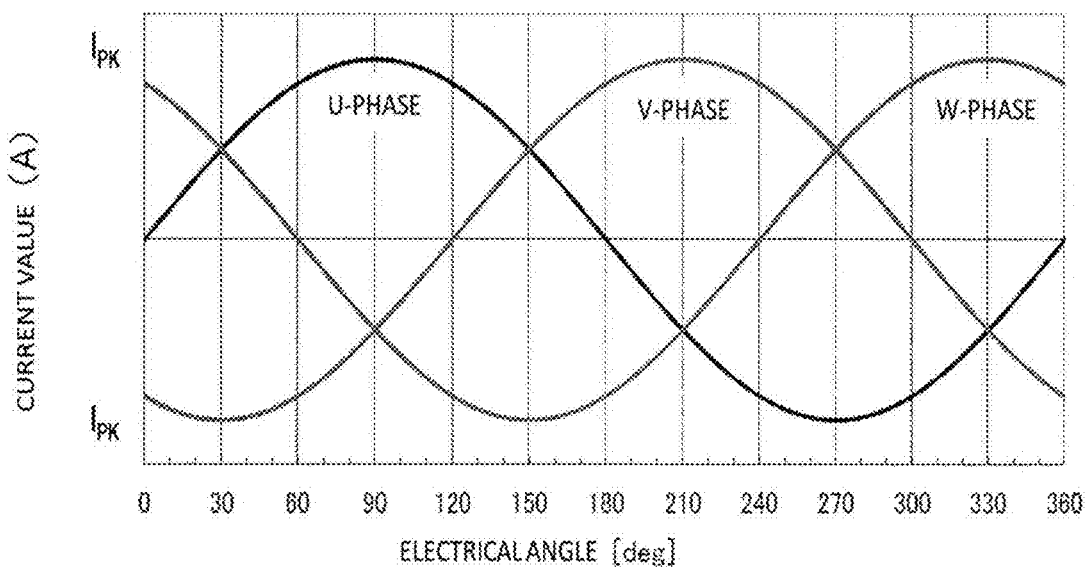
FIG. 4 is a graph illustrating an example of current waveforms (sine waves) obtained by plotting values of currents flowing through the windings (M1, M2, M3) by a three-phase energization control.

FIG. 4 illustrates an example of current waveforms (sine waves) obtained by plotting values of the currents flowing through the windings M1, M2, and M3 by the three-phase energization control. A horizontal axis represents electrical angles (deg) of the motor, and a vertical axis represents the values (A) of the current. $I_{pk}$ represents the maximum value (peak current value) of the phase current flowing through each phase. In a motor having a general Y-connection, the sum of the currents flowing through the three-phase windings is "0" in consideration of the direction of the current.

The control circuit 300 controls the switching operation of each switching element of the inverter 110 to obtain, for example, the pseudo sine wave shown in FIG. 4. Therefore, the motor 200 is driven.

When the power converter 100 is used for a long period of time, a failure may occur in the switching elements of the inverter 110 or the windings of the motor 200. These failures are different from the manufacturing failures which may occur during manufacturing. When such a failure occurs, the above-described control in the normal state cannot be performed.

As one example of failure detection, the driving circuit 340 monitors a voltage Vds between the drain and the source of the switching element and compares the Vds with a predetermined threshold voltage to detect the failure of the switching element. The threshold voltage is set in the driving circuit 340 through, for example, externally attached components and data communication with external ICs (not shown). The driving circuit 340 is connected to ports of the microcontroller 330 and notifies a failure detection signal to the microcontroller 330. For example, when the driving circuit 340 detects the failure of the switching element, the driving circuit 340 asserts the failure detection signal. When the microcontroller 330 receives the asserted failure detection signal, the microcontroller 330 may read the internal data of the driving circuit 340 to determine which switching element of the plurality of switching elements in the inverter 110 has failed.

As another example of the failure detection, the microcontroller 330 may detect the failure of the switching element on the basis of the difference between the actual current value of the motor and the target current value. Further, the microcontroller 330 may also detect whether the winding of the motor 200 is disconnected on the basis of, for example, the difference between the actual current value of the motor and the target current value. However, the failure detection is not limited thereto, and known methods related to the failure detection may be widely used.

When the failure detection signal is asserted, the microcontroller 330 switches the control of the power converter 100 from the control in the normal state to the control in the abnormal state. A time at which the control is switched from the normal state to the abnormal state is, for example, in the range of about 10 msec to 30 msec after the failure detection signal is asserted.

Hereinafter, control methods of each separation relay in each separation relay circuit will be described as examples of representative failure patterns.

FIG. 2 is referred to again.

For example, it is assumed that the high-side switching element SW_AH of the U-phase leg of the inverter 110 has an open failure. In that case, the control circuit 300 turns off the two-phase separation relays ISW_AH and ISW_AL of the U-phase leg in which the failed switching element is included and turns on the four-phase separation relays ISW_BH, ISW_BL, ISW_CH, and ISW_CL included in the V-phase and W-phase legs. By this control, the failed U-phase leg is electrically disconnected from the power supply 101. The V-phase and W-phase windings M2 and M3 are connected to the power supply 101 through the V-phase and W-phase legs.

The control circuit 300 further turns on the neutral point separation relay circuit 140. By this control, the neutral point leg 120 is connected to the neutral point node N of the motor 200. In this connection state, the motor 200 may be continuously driven by energizing the two-phase windings M2 and M3 using the V-phase and W-phase legs of the inverter 110. In the present specification, the energization control using two-phase legs is referred to as a "two-phase energization control".

The phase current flowing into the neutral point node N of the motor 200 from the node n2 of the V-phase leg through the winding M2 is expressed as $I_b$, and the phase current flowing into the neutral point node N from the node n3 of the W-phase leg through the winding M3 is expressed as $I_c$. Further, the current flowing out of the neutral point node N to the node n4 of the neutral point leg 120 is expressed as $I_z$. In the two-phase energization control, $I_b+I_c=I_z$ is formed.

The control circuit 300 may energize the windings M2 and M3, for example, by controlling the switching operation of the switching elements of the V-phase and W-phase legs and the neutral point leg 120 of the inverter 110. Specifically, the two-phase energization control may be performed by controlling potentials of the node n2 of the V-phase leg, the node n3 of the W-phase leg, and the neutral point node N so as to satisfy $I_b+I_c=I_z$. The phase current $I_b$ flows according to the potential difference between the node n2 and the neutral point node N. The phase current $I_c$ flows according to the potential difference between the node n3 and the neutral point node N.

For example, the two-phase energization control may be performed even when the two switching elements SW_AH and SW_AL of the U-phase leg have simultaneously failed. Further, for example, when the U-phase winding M1 has failed, the winding M1 may be electrically disconnected from the power supply 101 by turning off the two-phase separation relays ISW_AH and ISW_AL as in the case in which the U-phase leg has failed.

For example, when two-phase legs have failed in an inverter having four-phase legs for driving a four-phase AC motor, the two-phase energization control method of the present disclosure may be suitably applied.

According to the above-described control method, in the control in the abnormal state, the failed leg may be electrically disconnected from the power supply 101 using the phase separation relay, and the neutral point leg 120 may be connected to the neutral point node N using the neutral point separation relay circuit 140. The two-phase energization control may be performed by appropriately controlling the potential of the neutral point node N using the neutral point leg 120. The motor driving unit 1000 may be continuously driven.

Figure 5:
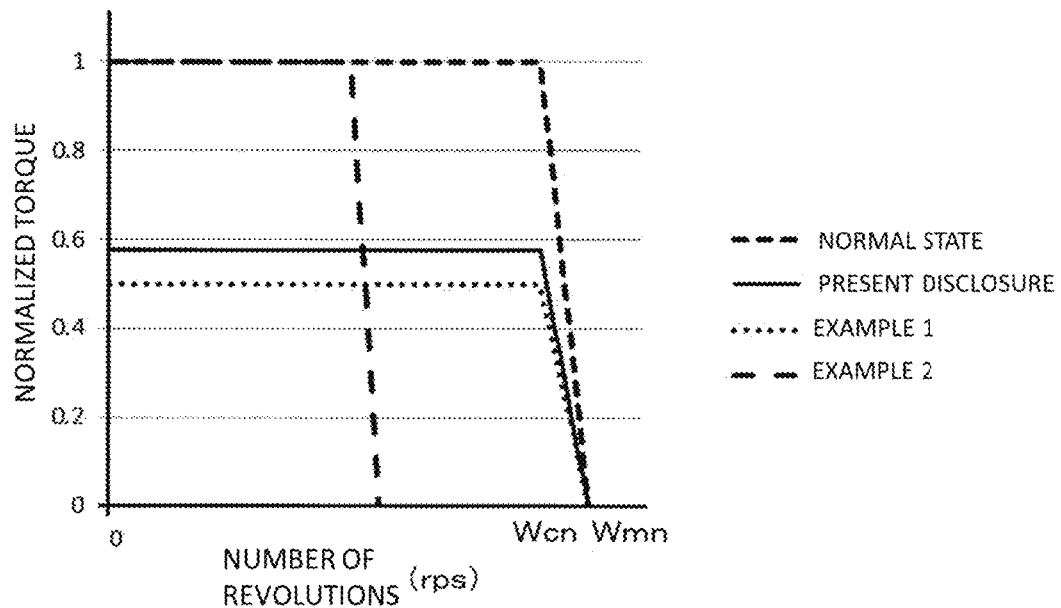
FIG. 5 is a graph illustrating a relationship between the number of revolutions per unit time (revolutions per second (RPS)) of a motor and torque T (newton meter (N·m)).

FIG. 5 illustrates a relationship between the number of revolutions per unit time (revolutions per second (RPS)) of the motor and torque T (newton meter (N·m)). In the graph, a horizontal axis represents the number of revolutions, and a vertical axis represents values of the normalized torque. In the number of revolutions, Wmn represents the maximum number of revolutions. In motor output characteristics, Wcn represents the number of revolutions at a changed point at which the torque rapidly changes.

The so-called T-N curve shown in FIG. 5 illustrates the motor output characteristics obtained by the control in the normal state and the motor output characteristics obtained by the control in the abnormal state. The torque value obtained by the control in the abnormal state represents a value normalized by the torque value obtained by the control in the normal state. Further, as a comparative example, the motor output characteristics in the control in the abnormal state, which are obtained by the control method of the Example 1 and Example 2, are shown in FIG. 5.

In the motor driving device of the Example 1, the motor is driven using one of the first system and the second system which hasn't failed in the control in the abnormal state. Since the maximum value of the phase current in the control in the abnormal state is reduced to about 50% in comparison with that in the control in the normal state, the torque obtained by the control in the abnormal state is also reduced to about 50% in comparison with that in the control in the normal state. Meanwhile, since the maximum value of a phase voltage applied to each phase winding is not changed by the control in the normal and abnormal states, the maximum number of revolutions Wmn is maintained.

In the motor driving device of the Example 2, the current flowing through each of the three-phase windings may be controlled independently in the control in the normal state. Thus, in the control in the abnormal state, the motor may be driven by an inverter of substantially only one side using the neutral point of the failed inverter. Since the maximum value of the phase voltage applied to each phase winding is reduced to about 58% in comparison with that in the normal state, the maximum number of revolutions obtained by the control in the abnormal state is reduced to about 58% in comparison with the maximum number of revolutions Wmn in the normal state. Thus, a high-speed rotation region is reduced to a low-speed side, and the motor may not be driven at a higher speed. Meanwhile, since the maximum value of the phase current of the motor is not changed by the control in the normal and abnormal states, the torque is maintained.

According to the control method of the present disclosure, when the maximum value $I_{pk}$ of the phase current in the three-phase energization control in the normal state is set to 1, the maximum value $I_{pk}$ of the phase current by the two-phase energization control in the abnormal state theoretically becomes about 0.58. Thus, the torque obtained by the control in the abnormal state is about 58% of that in the control in the normal state. Meanwhile, since the maximum value of the phase voltage applied to each phase winding is not changed by the control in the normal and abnormal states, the maximum number of revolutions Wmn is maintained. Also, the number of revolutions Wcn may be maintained.

In summary, as shown in FIG. ti, in comparison with the aced art, the maximum number of revolutions Wmn and the number of revolutions Wcn of the motor in the control in the abnormal state may be maintained as the same value as that in the normal state. As a result, it is possible to improve the motor output, that is, a driving range of the motor. In particular, higher torque may be obtained in the high-speed rotation region. Compared to the related art, the obtained torque is increased by 16% (=58/50). According to the present example embodiment, the motor output characteristics in the control in the abnormal state may be further improved.

Figure 6:
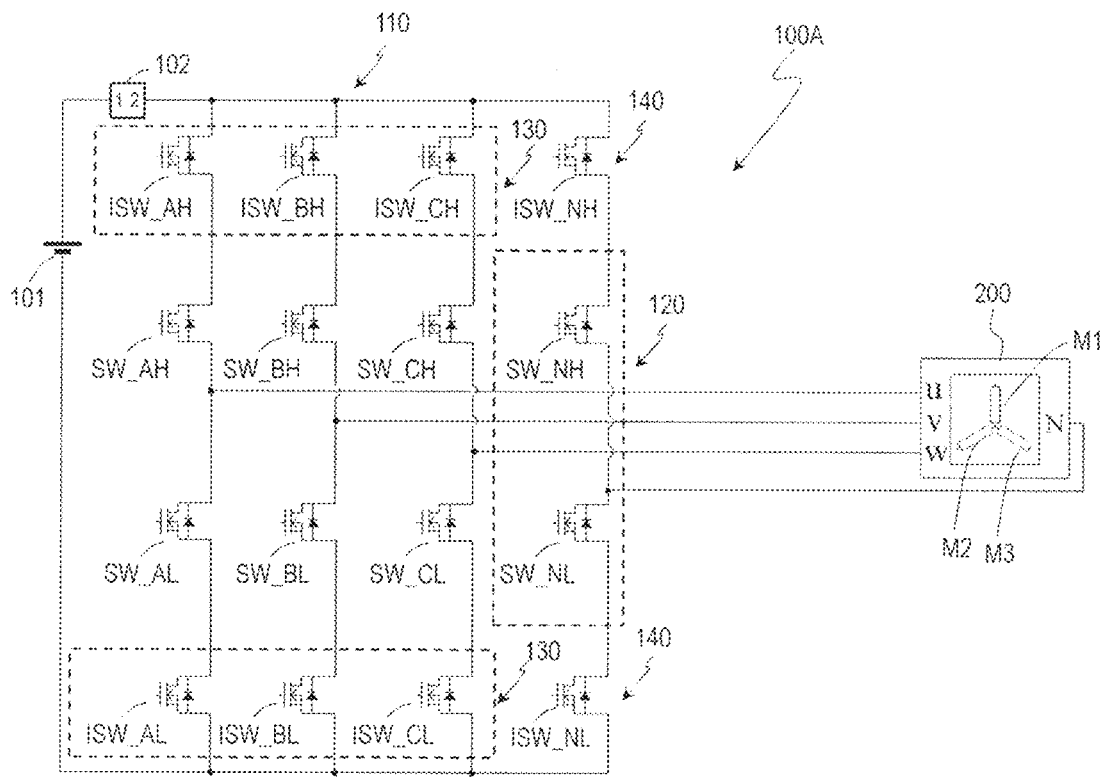
FIG. 6 is a circuit diagram schematically illustrating a typical circuit configuration of a power converter 100A according to a modified example of the first example embodiment of the present disclosure.

FIG. 6 schematically illustrates a typical circuit configuration of a power converter 100A according to a modified example of the present example embodiment.

The power converter 100A differs from the power converter 100 in that a neutral point separation relay circuit 140 is installed in a neutral point leg 120. Hereinafter, mainly the differences will be described.

In the present modified example, the neutral point separation relay circuit 140 switches connection and disconnection between a power supply 101 and the neutral point leg 120. The neutral point leg 120 is connected to a neutral point node N. The neutral point separation relay circuit 140 includes a neutral point separation relay ISW_NH connected between a high-side switching element SW_NH of the neutral point leg 120 and a high-side node and includes a neutral point separation relay ISW_NL connected between a low-side switching element SW_NL of the neutral point leg 120 and a low-side node. The neutral point separation relay ISW_NH is connected to the high-side switching element SW_NH in series, and the neutral point separation relay ISW_NL is connected to the low-side switching element SW_NL in series.

In control in the normal state, the neutral point leg 120 is electrically disconnected from the power supply 101 by turning off the two neutral point separation relays ISW_NH and ISW_NL. Here, the neutral point leg 120 is not involved in supplying power to a motor 200. In control in the abnormal state, the neutral point leg 120 is connected to the power supply 101 by turning on the two neutral point separation relays ISW_NH and ISW_NL. Here, the neutral point leg 120 may be involved in supplying the power to the motor 200.

Figure 7:
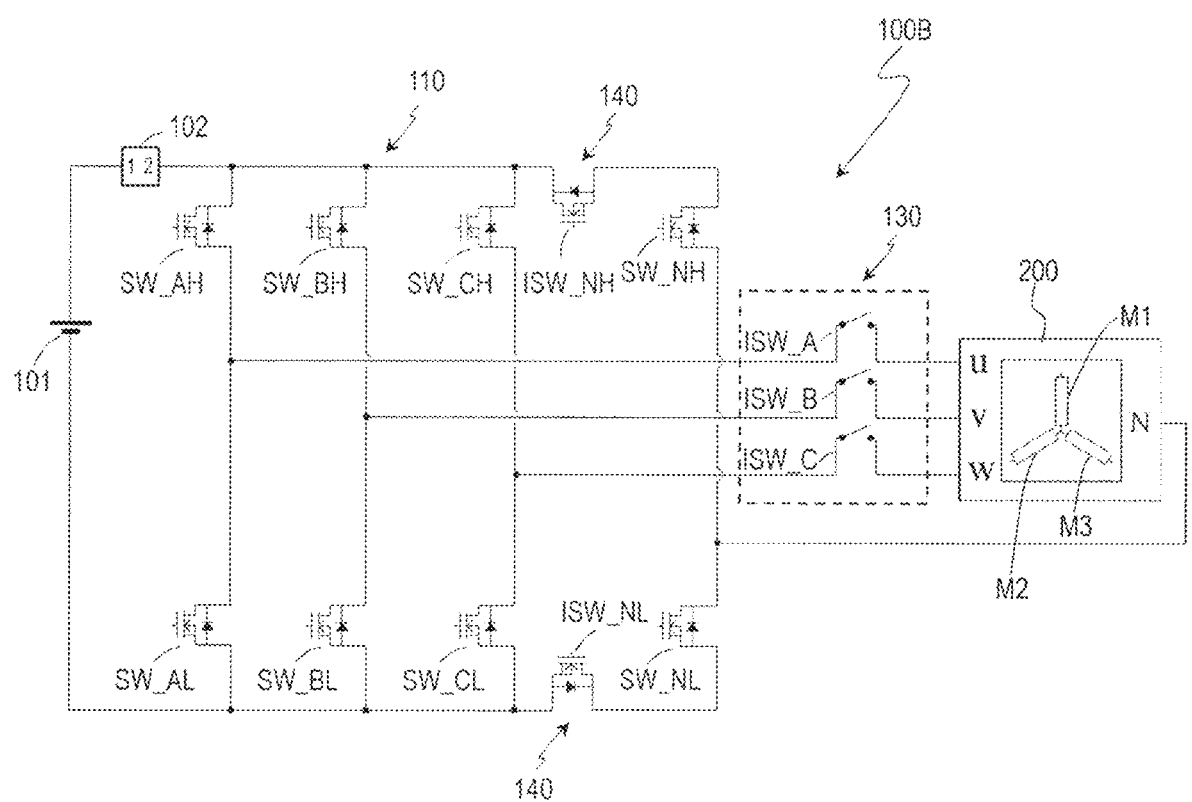
FIG. 7 is a circuit diagram schematically illustrating a typical circuit configuration of a power converter 100B according to a second example embodiment of the present disclosure.

FIG. 7 schematically illustrates a typical circuit configuration of a power converter 100B according to the present example embodiment.

The power converter 100B differs from the power converter 100 according to the first example embodiment in that a phase separation relay circuit 130 is connected between an inverter 110 and windings M1, M2, and M3. Hereinafter, mainly the differences will be described.

The phase separation relay circuit 130 is connected between the inverter 110 and other ends of the windings M1, M2, and M3. The phase separation relay circuit 130 switches connection and disconnection between the three legs of the inverter 110 and the other ends of the windings M1, M2, and M3 for each phase.

The phase separation relay circuit 130 includes three-phase separation relays ISW_A, ISW_B, and ISB_C connected between the three legs of the inverter 110 and the other ends of the windings M1, M2, and M3. The three-phase separation relays ISW_A, ISW_B, and ISB_C may be one-way switches or bidirectional switches such as the neutral point separation relay circuit 140 shown in FIG. 2.

The phase separation relay ISW_A is connected to each of the high-side switching element SW_AH and the low-side switching element SW_AL of a U-phase leg in series. The phase separation relay ISW_B is connected to each of the high-side switching element SW_BH and the low-side switching element SW_BL of a V-phase leg in series. The phase separation relay ISW_C is connected to each of the high-side switching element SW_CH and the low-side switching element SW_CL of a W-phase leg in series.

The U-phase leg of the inverter 110 is connected to a winding M1 by turning on the phase separation relay ISW_A, and the U-phase leg is electrically disconnected from the winding M1 by turning off the phase separation relay ISW_A. The V-phase leg is connected to a winding M2 by turning on the phase separation relay ISW_B, and the V-phase leg is electrically disconnected from the winding M2 by turning off the phase separation relay ISW_B. The W-phase leg is connected to a winding M3 by turning on the phase separation relay ISW_C, and the W-phase leg is electrically disconnected from the winding M3 by turning off the phase separation relay ISW_C.

A neutral point separation relay circuit 140 switches connection and disconnection between a power supply 101 and a neutral point leg 120. The neutral point separation relay circuit 140 includes a neutral point separation relay ISW_NH connected between a high-side switching element SW_NH of the neutral point leg 120 and a high-side node and includes a neutral point separation relay ISW_NL connected between a low-side switching element SW_NL of the neutral point leg 120 and a low-side node.

According to the present example embodiment, as in the first example embodiment, a two-phase energization control may be performed in an abnormal state by determining an on or off state of each separation relay of the phase separation relay circuit 130 and neutral point separation relay circuit 140 according to failure patterns.

Figure 8:
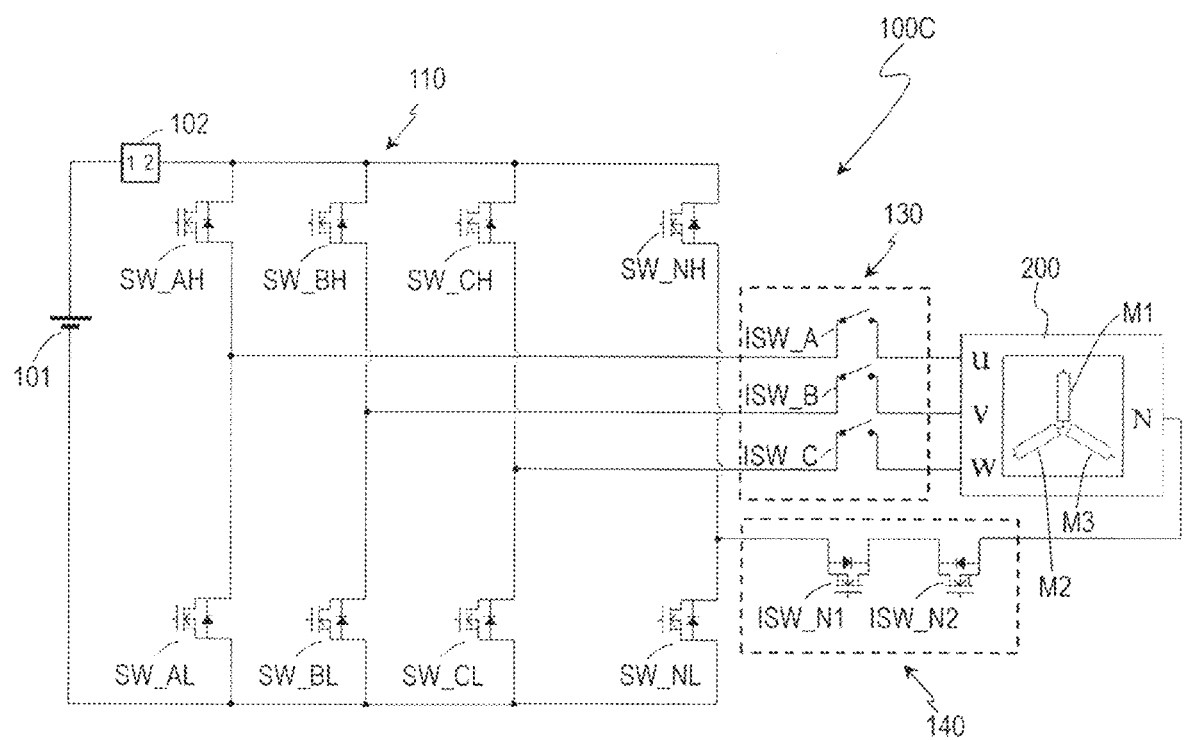
FIG. 8 is a circuit diagram schematically illustrating a typical circuit configuration of a power converter 100C according to a modified example of the second example embodiment of the present disclosure.

FIG. 8 schematically illustrates a typical circuit configuration of a power converter 100C according to a modified example of the present example embodiment.

The power converter 100C differs from the power converter 100B in that a neutral point separation relay circuit 140 is connected between a neutral point leg 120 and a neutral point node N.

The neutral point separation relay circuit 140 is connected between the neutral point leg 120 and the neutral point node N. In the present modified example, a phase separation relay circuit 130 and the neutral point separation relay circuit 140 are connected between an inverter 110 and a motor 200. The phase separation relay circuit 130 and the neutral point separation relay circuit 140 may be manufactured as a component separate from the inverter 110.

Figure 9:
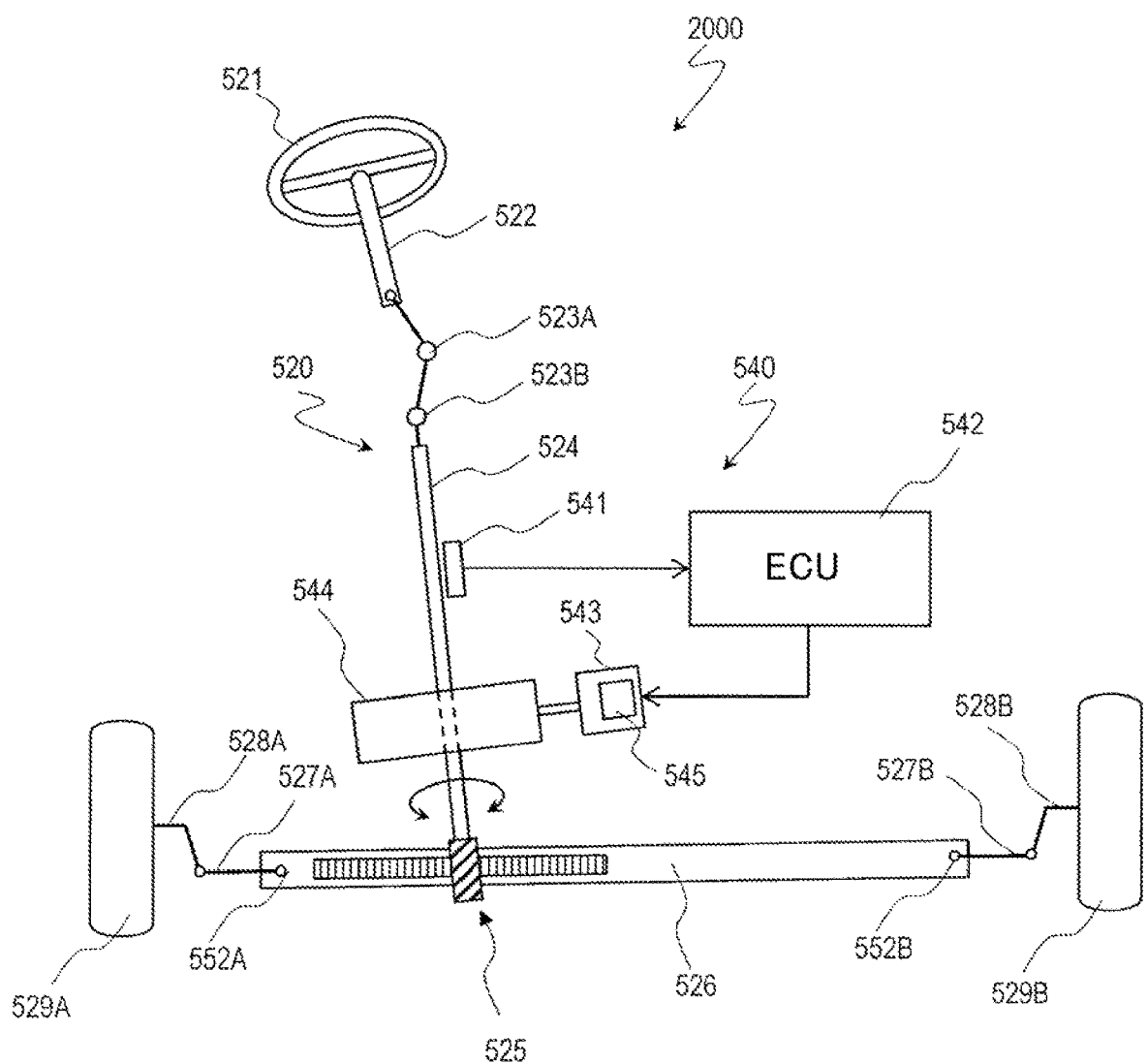
FIG. 9 is a schematic diagram illustrating a typical configuration of an electric power steering device 2000 according to a third example embodiment of the present disclosure.

FIG. 9 schematically illustrates a typical configuration of an electric power steering device 2000 according to the present example embodiment.

Vehicles such as automobiles generally include an electric power steering (EPS) device. The electric power steering device 2000 according to the present example embodiment includes a steering system 520 and an auxiliary torque mechanism 540 generating an auxiliary torque. The electric power steering device 2000 generates the auxiliary torque that assists a steering torque of the steering system generated by a driver's operation of a steering wheel. The strain on the driver's operation is reduced by the auxiliary torque.

The steering system 520 may include, for example, a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, and left and right steering wheels 529A and 529B.

The auxiliary torque mechanism 540 includes, for example, a steering torque sensor 541, an electronic control unit (ECU) 542 for an automobile, a motor 543, and a reduction mechanism 544. The steering torque sensor 541 detects a steering torque in the steering system 520. The ECU 542 generates a driving signal on the basis of the detected signal by the steering torque sensor 541. The motor 543 generates an auxiliary torque on the basis of the steering torque on the basis of the driving signal. The motor 543 transfers the generated auxiliary torque to the steering system 520 through the reduction mechanism 544.

The ECU 542 includes, for example, the microcontroller 330 and the driving circuit 340 according to the first example embodiment. In automobiles, an electronic control system is built using an ECU as a core. In the electric power steering device 2000, a motor driving unit is built, for example, of the ECU 542, the motor 543, and an inverter 545. The motor driving unit 1000 according to the first example embodiment may be suitably used for the system.

The example embodiments of the present disclosure may also be suitably used for motor control systems such as a shift-by-wire system, a steering-by-wire system, an X-by-wire systems such as a brake-by-wire system, a traction motor system, and the like. For example, the motor control system according to the example embodiments of the present disclosure may be mounted on an automated driving vehicle corresponding to levels 0 to 4 (automation levels) defined by the Government of Japan and the National Highway Traffic Safety Administration (NHTSA) of the US Department of Transportation.

The example embodiments of the present disclosure may be widely used in a variety of devices equipped with various motors, such as cleaners, dryers, ceiling fans, washing machines, refrigerators, and electric power steering devices.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power converter to convert power from a power supply into power supplied to a motor including n-phase windings, where n is an integer of 3 or more, in which first ends thereof are Y-connected, the power converter comprising:
   an inverter connected to second ends of the n-phase windings and including n legs each including a low-side switching element and a high-side switching element;
   a phase separation relay circuit to switch connection and disconnection between the power supply and the n-phase windings for each phase;
   a neutral point leg including a low-side switching element and a high-side switching element and connected to a neutral point node of the motor, in which the first ends of the n-phase windings are Y-connected; and
   a neutral point separation relay circuit to switch connection and disconnection between the power supply and the neutral point node; wherein
   the phase separation relay circuit is connected between the inverter and the second ends of the n-phase windings and switches connection and disconnection between the n legs of the inverter and the second ends of the n-phase windings for each phase;
   the neutral point separation relay circuit switches connection and disconnection between the power supply and the neutral point leg; and
   the phase separation relay circuit incudes n phase separation relays connected between the n legs of the inverter and the second ends of the n-phase windings, and the neutral point separation relay circuit includes a first neutral point separation relay connected between a high-side node to which the n legs of the inverter are connected and the high-side switching element of the neutral point leg and a second neutral point separation relay connected between a low-side node to which the n legs of the inverter are connected and the low-side switching element of the neutral point leg.

2. The power converter of claim 1, wherein the neutral point leg is connected between low-side and high-side nodes to which the n legs of the inverter are connected.

3. The power converter of claim 1, wherein the phase separation relay circuit switches connection and disconnection between the power supply and the inverter for each phase.

4. The power converter of claim 3, wherein the neutral point separation relay circuit is connected between the neutral point leg and the neutral point node and switches connection and disconnection between the neutral point leg and the neutral point node.

5. The power converter of claim 3, wherein the neutral point separation relay circuit switches connection and disconnection between the power supply and the neutral point leg.

6. The power converter of claim 4, wherein the phase separation relay circuit includes n first phase separation relays in the inverter connected between the high-side node to which the n legs of the inverter are connected and the n high-side switching elements and n second phase separation relays in the inverter connected between the low-side node to which the n legs of the inverter are connected and the n low-side switching elements, and the neutral point separation relay circuit includes first and second neutral point separation relays connected in series.

7. The power converter of claim 6, wherein each of the first and second neutral point separation relays includes a diode, the first neutral point separation relay connected to the neutral point leg is disposed such that a forward current flows in the diode toward the neutral point node, and the second neutral point separation relay connected to the neutral point node is disposed such that a forward current flows in the diode toward the neutral point leg.

8. The power converter of claim 5, wherein the phase separation relay circuit includes n first phase separation relays in the inverter connected between the high-side node to which the n legs of the inverter are connected and the n high-side switching elements, and n second phase separation relays in the inverter connected between the low-side node to which the n legs of the inverter are connected and the n low-side switching elements, and the neutral point separation relay circuit includes a first neutral point separation relay connected between the high-side node and the high-side switching element of the neutral point leg and a second neutral point separation relay connected between the low-side node and the low-side switching element of the neutral point leg.

9. The power converter of claim 1, wherein the neutral point separation relay circuit is connected between the neutral point leg and the neutral point node and switches connection and disconnection between the neutral point leg and the neutral point node.

10. The power converter of claim 9, wherein the phase separation relay circuit includes n phase separation relays connected between the n legs of the inverter and the second ends of the n-phase windings, and the neutral point separation relay circuit includes first and second neutral point separation relays connected in series.

11. The power converter of claim 1, wherein a control mode in a normal state and a control mode in an abnormal state are included as control modes of power conversion, and the phase separation relay circuit is turned on and the neutral point separation relay circuit is turned off in the control mode in a normal state.

12. The power converter of claim 11, wherein the neutral point separation relay circuit is turned on in the control mode in an abnormal state.

13. The power converter of claim 6, wherein a control mode in a normal state and a control mode in an abnormal state are included as control modes of power conversion, and when n-2 legs of the n legs have failed, in the control in an abnormal state, n-2 first phase separation relays and n-2 second phase separation relays of the n-2 failed legs among the n first phase separation relays and the n second phase separation relays are turned off, two first phase separation relays and two second phase separation relays of two non-failed legs are turned on, and the neutral point separation relay circuit is turned on.

14. A motor driving unit comprising:
the power converter according to claim 1;
a motor; and
a control circuit to control the power converter.

15. An electric power steering device, comprising:
the motor driving unit of claim 14;
a steering system; and
an auxiliary torque mechanism generating an auxiliary torque.

* * * * *